United States Patent
Cox et al.

(10) Patent No.: US 9,573,606 B2
(45) Date of Patent: Feb. 21, 2017

(54) INTEGRATED WALKWAY SYSTEM

(75) Inventors: Martin Cox, Surrey (CA); Brian Maver, Delta (CA)

(73) Assignee: Superior Tray Systems Inc., Surrey (CA)

(*) Notice: Subject to any disclaimer, the term of this patent is extended or adjusted under 35 U.S.C. 154(b) by 714 days.

(21) Appl. No.: 12/648,499

(22) Filed: Dec. 29, 2009

(65) Prior Publication Data
US 2010/0162645 A1 Jul. 1, 2010

Related U.S. Application Data

(60) Provisional application No. 61/141,190, filed on Dec. 29, 2008.

(51) Int. Cl.
| | | |
|---|---|---|
| H02G 3/38 | (2006.01) |
| B61K 13/00 | (2006.01) |
| E04F 15/024 | (2006.01) |
| E04F 15/02 | (2006.01) |
| B61B 1/02 | (2006.01) |

(52) U.S. Cl.
CPC ............... *B61K 13/00* (2013.01); *B61B 1/02* (2013.01); *E04F 15/024* (2013.01); *E04F 15/02177* (2013.01); *E04F 15/02447* (2013.01); *E04F 15/02458* (2013.01); *H02G 3/283* (2013.01); *H02G 3/285* (2013.01); *H02G 3/385* (2013.01); *H02G 3/38* (2013.01)

(58) Field of Classification Search
USPC ..... 52/177, 220.1, 220.2, 263, 489.1, 650.3; 405/218; 114/44
See application file for complete search history.

(56) References Cited

U.S. PATENT DOCUMENTS

| | | | | |
|---|---|---|---|---|
| 3,094,848 | A | * | 6/1963 | Albrecht ........................ 405/221 |
| 4,087,977 | A | * | 5/1978 | Kuhlman ...................... 405/218 |
| 4,223,629 | A | | 9/1980 | Dunlop |
| 4,352,597 | A | | 10/1982 | Kay |
| 5,106,237 | A | * | 4/1992 | Meldrum ....................... 405/221 |
| 5,816,010 | A | * | 10/1998 | Conn ........................... 52/588.1 |
| 5,950,377 | A | * | 9/1999 | Yoder ............................. 52/177 |
| 2007/0248420 | A1 | * | 10/2007 | Jacobs et al. ................. 405/218 |
| 2012/0031017 | A1 | * | 2/2012 | Stroyer ........................... 52/157 |

OTHER PUBLICATIONS

NEMA Standards Publication VE Feb. 2006, Cable Tray Installation Guidelines, National Electrical Manufacturers Association, 2006.
Thomas & Betts Cable Tray Systems Catalogue, 2003.
Thomas & Betts Cable Tray Systems Catalogue, 2007.
Excerpt from Richmond/Airport/Vancouver Rapid Transit Canada Line Elevated and AT-Grade Guideway proposal, Dec. 22, 2006.

* cited by examiner

*Primary Examiner* — Jessica Laux
(74) *Attorney, Agent, or Firm* — Norton Rose Fulbright Canada

(57) ABSTRACT

A walkway system comprising a plurality of support assemblies, each having a pair of spaced apart beam support plates on an upper side thereof, and a plurality of pairs of beams. Each pair of beams is supported by pairs of spaced apart beam support plates of at least two support assemblies. A plurality of cross members extend between lower portions of the pairs of beams. The cross members are configured to support one or more cables resting thereupon. A plurality of decking members extend between the pairs of beams. The decking members are secured to upper sides of the beams. The cross members, beams and decking members cooperate to form a partial enclosure for the cables, thereby eliminating the need for a separate cable tray.

15 Claims, 14 Drawing Sheets

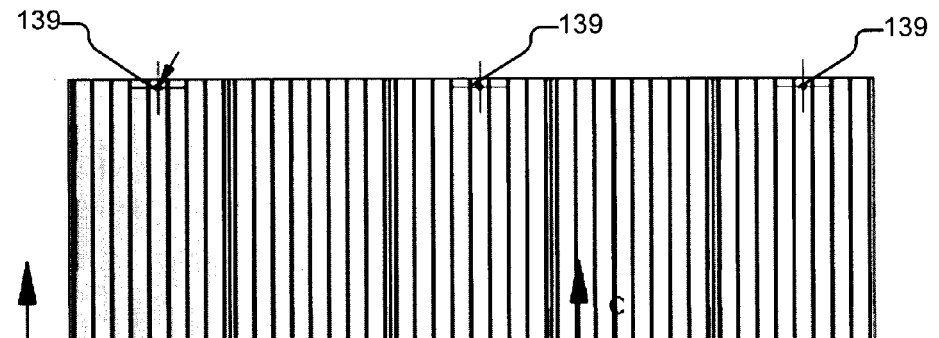
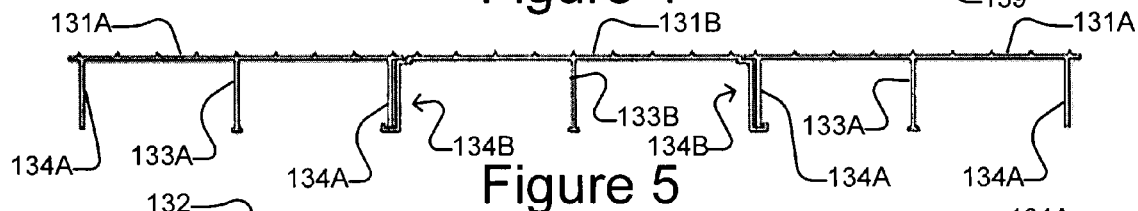
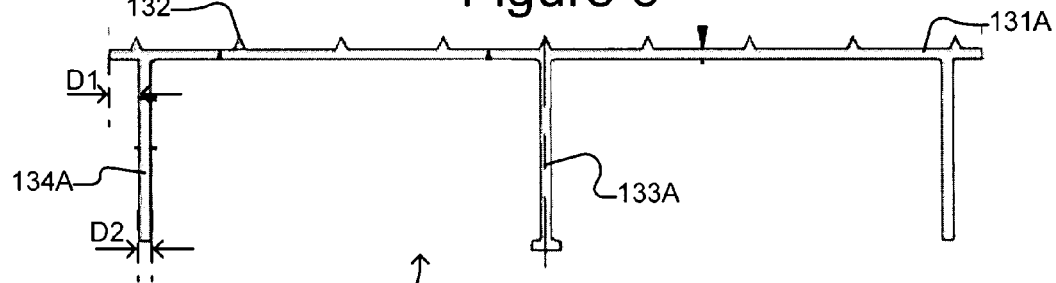
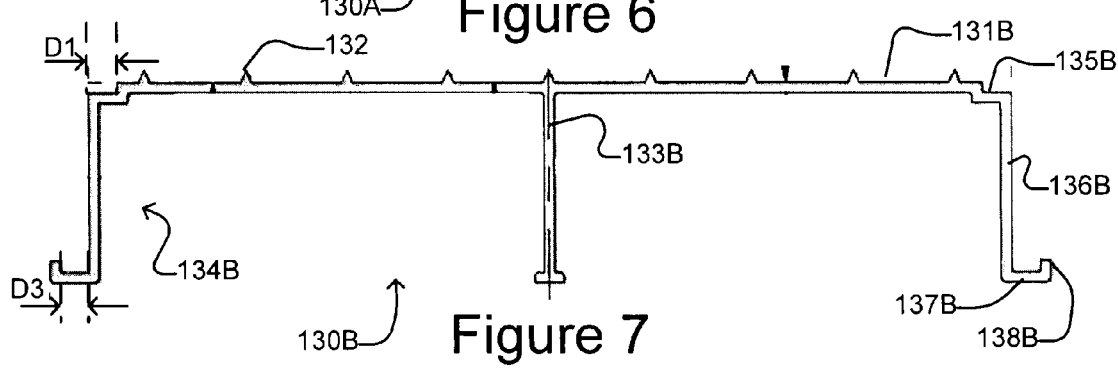

INTEGRATED WALKWAY SYSTEM

CROSS REFERENCE TO RELATED APPLICATIONS

This application claims the benefit under 35 U.S.C. §119 of U.S. Patent Application No. 61/141,190 filed on 29 Dec. 2008 and entitled INTEGRATED WALKWAY SYSTEM which is hereby incorporated herein by reference.

TECHNICAL FIELD

The invention relates to walkways. Certain embodiments provide integrated walkway systems for use with railways.

BACKGROUND

Walkways are often erected next to railways, particularly next to elevated railways. Such walkways may facilitate access to the tracks for maintenance staff. Walkways may also be erected to provide a safe platform for receiving passengers exiting from trains in the event of an emergency or an unscheduled stop between stations.

FIGS. 17A-C show an example section of a prior art walkway. In the illustrated example, a steel frame is provided which includes a number of vertical posts 10, diagonal braces 12, lateral supports 14, upper longitudinal supports 16 and lower longitudinal supports 18. Lateral supports 14 support one or more cable trays 20 (see FIG. 17C) for carrying cables. A cover plate 17 may be attached between upper longitudinal supports 16 and lower longitudinal supports 18. Upper longitudinal supports 16 support a plurality of decking planks 30, which are typically covered with safety tread to provide increased traction.

Typical prior art walkways are generally constructed primarily from steel, due to its strength. However, steel can be relatively difficult to work with, and is relatively heavy, which can lead to increased costs. Also, it is often not cost effective to form curved walkways from steel, so instead prior art walkways are typically made up of a number of straight sections when the walkway is placed alongside a curved railway.

The foregoing examples of the related art and limitations related thereto are intended to be illustrative and not exclusive. Other limitations of the related art will become apparent to those of skill in the art upon a reading of the specification and a study of the drawings.

SUMMARY

The following embodiments and aspects thereof are described and illustrated in conjunction with systems, tools and methods which are meant to be exemplary and illustrative, not limiting in scope. In various embodiments, one or more of the above-described problems have been reduced or eliminated, while other embodiments are directed to other improvements.

One aspect of the invention provides a walkway system comprising a cable tray system which both supports cables and serves as part of the structural support of the walkway system. Certain embodiments of the invention thus provide walkway systems which are structurally sound and are more cost effective and faster and easier to install than typical prior art walkway systems.

Another aspect of the invention provides a walkway system comprising a plurality of support assemblies, each having a pair of spaced apart beam support plates on an upper side thereof, and a plurality of pairs of beams. Each pair of beams is supported by pairs of spaced apart beam support plates of at least two support assemblies. A plurality of cross members extend between lower portions of the pairs of beams. The cross members are configured to support one or more cables resting thereupon. A plurality of decking members extend between the pairs of beams. The decking members are secured to upper sides of the beams. The cross members, beams and decking members cooperate to form a partial enclosure for the cables, thereby eliminating the need for a separate cable tray.

Further aspects of the invention and details of example embodiments are described below.

BRIEF DESCRIPTION OF DRAWINGS

In drawings which illustrate non-limiting example embodiments of the invention:

FIG. 4 is a top view of decking members according to one embodiment of the invention;

FIG. 5 is a sectional view taken along line C-C of FIG. 4;

FIG. 6 is a sectional view of a first type of decking member;

FIG. 7 is a sectional view of a second type of decking member;

FIG. 13C is an overhead view of the walkway system of FIG. 13;

DESCRIPTION

Throughout the following description specific details are set forth in order to provide a more thorough understanding to persons skilled in the art. However, well known elements may not have been shown or described in detail to avoid unnecessarily obscuring the disclosure. Accordingly, the description and drawings are to be regarded in an illustrative, rather than a restrictive, sense.

FIGS. 1, 1A, 1B, 2 and 3 show an integrated walkway system 100 according to an example embodiment of the invention. Walkway system 100 comprises a plurality of support assemblies 110 which are configured to be secured to the ground or other supporting structure upon which walkway system 100 is to be mounted. A decking assembly 120 is mounted atop support assemblies 110. Walkway system 100 is preferably constructed entirely or almost entirely from aluminum, thereby providing reduced weight as compared to prior art walkway systems, which are typically constructed primarily from steel.

Decking assembly 120 defines a partial enclosure 140 in which a plurality of electrical cables or other elongated members may be supported, as described further below. Walkway system 100 thus eliminates the need for separate supporting structures such as cable trays or the like, which is typically required in prior art walkway systems in order to accommodate cables or other elongated members.

Figure 1:
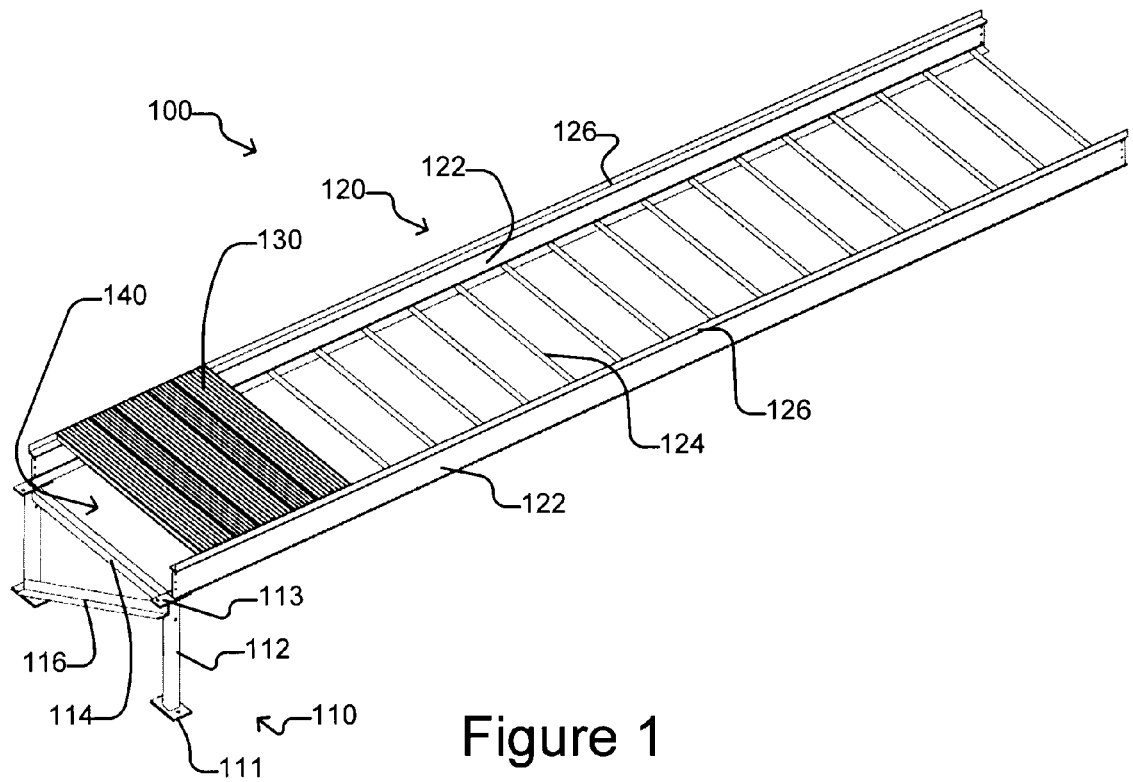
FIG. 1 shows a section of walkway system according to one embodiment of the invention with some of the decking members removed.
Figure 1A:
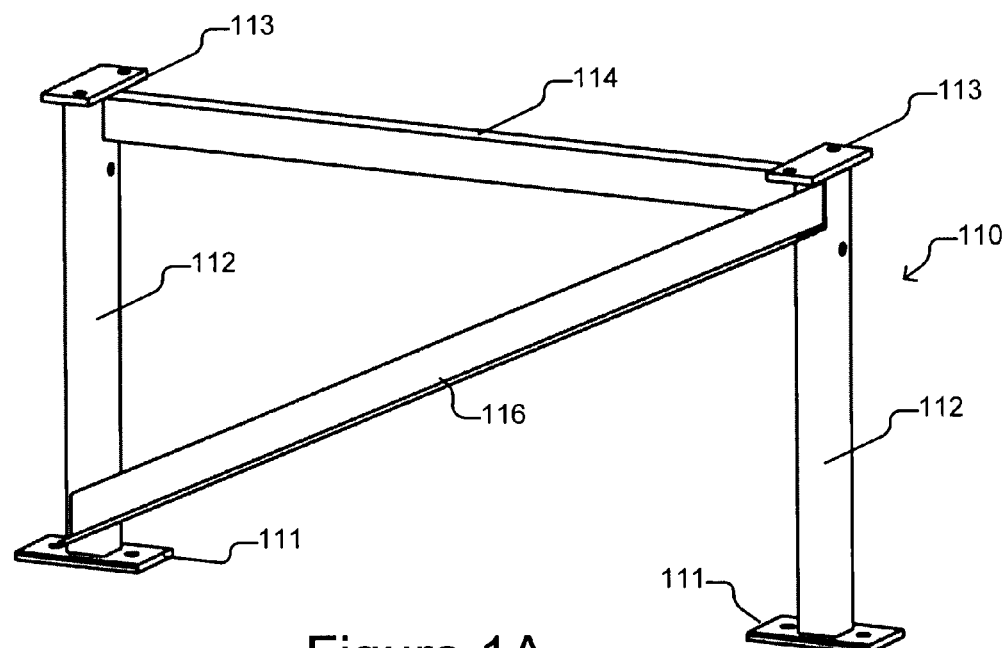
FIG. 1A shows a support assembly of the walkway system of FIG. 1.
Figure 1B:
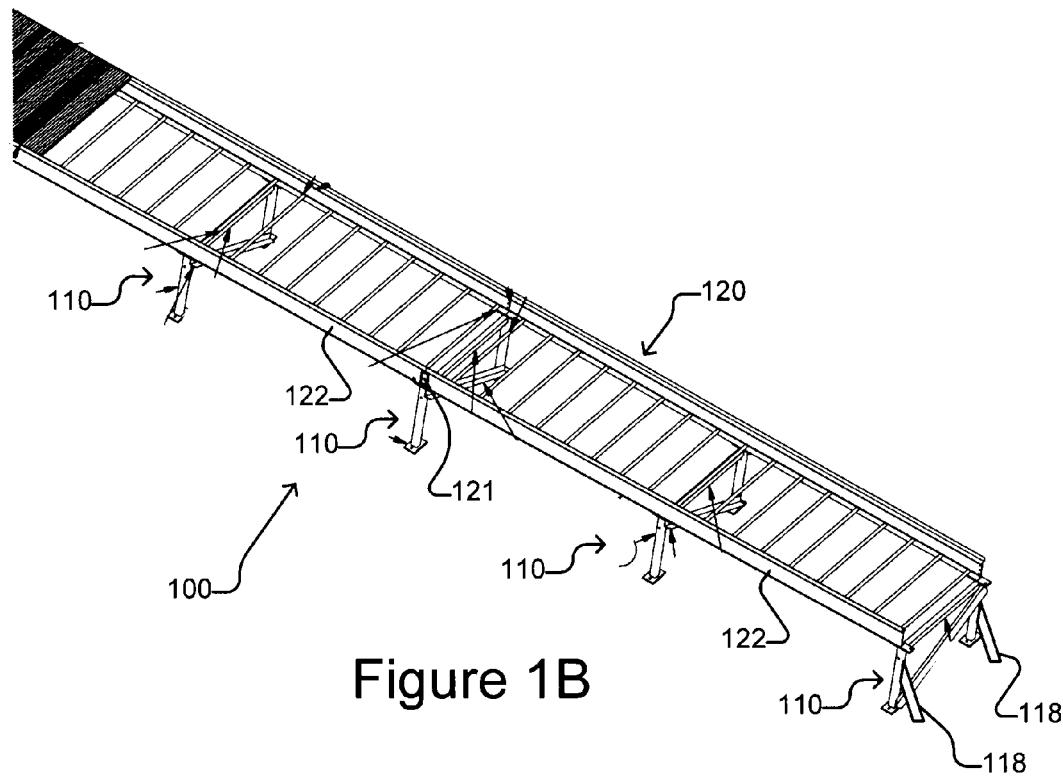
FIG. 1B shows a number of sections of the walkway system of FIG. 1
Figure 2:
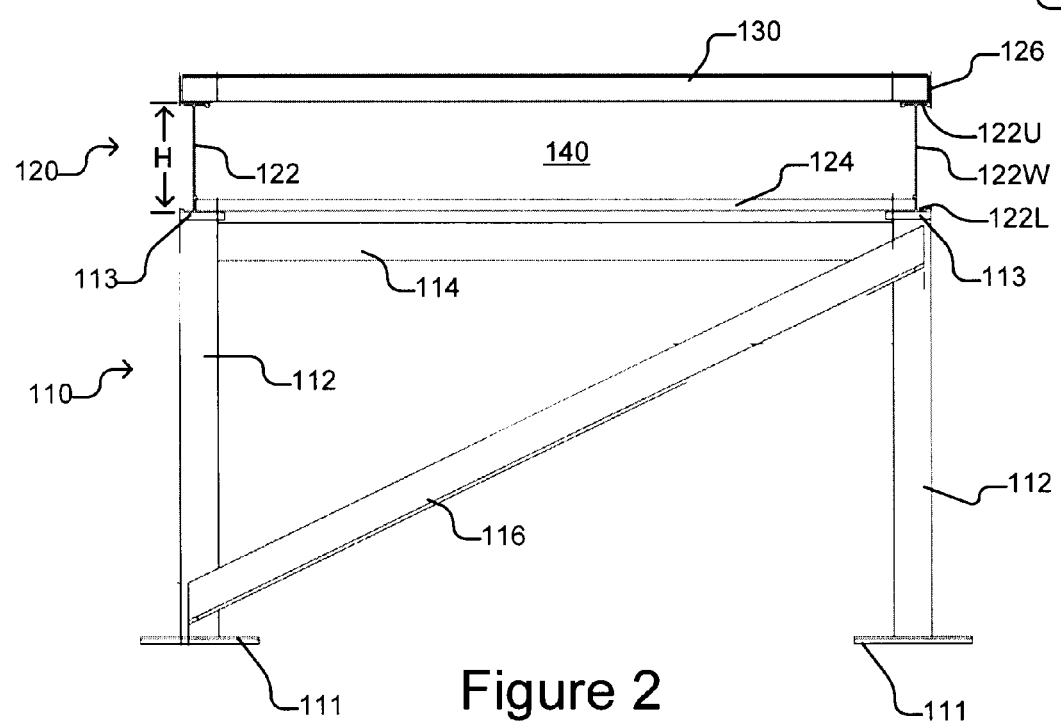
FIG. 2 shows an end view of the walkway system of FIG. 1.
Figure 3:
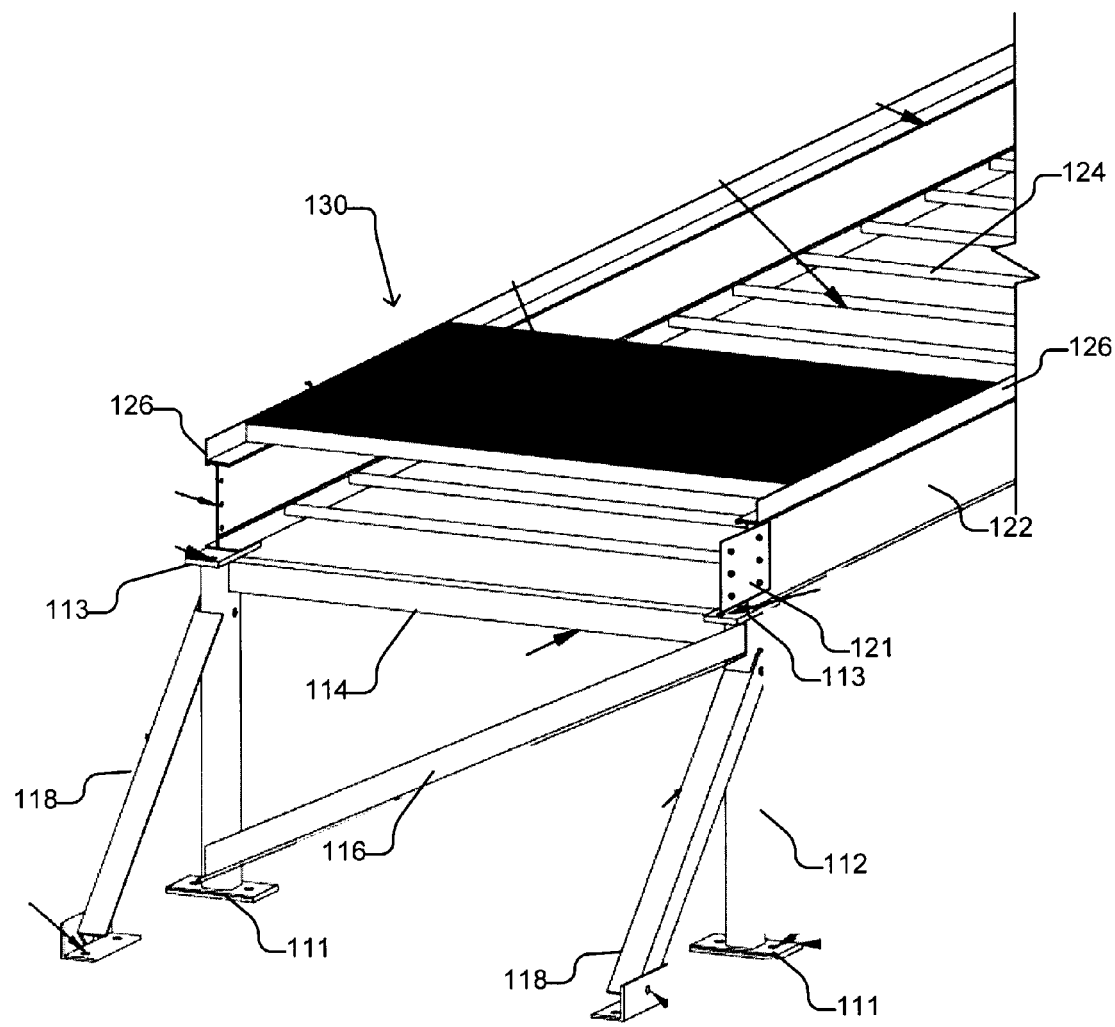
FIG. 3 is a close-up view of a portion of the walkway system of FIG. 1.

In the embodiment shown in FIGS. 1-3, each support assembly 110 comprises a pair of generally vertical posts 112 connected by a horizontal brace 114 and a diagonal brace 116. Each post 112 has a base plate 111 coupled to the bottom thereof for securing support assembly 110 to the supporting structure (not shown). Each post 112 also has a beam support plate 113 coupled to the top thereof for securing support assembly 110 to decking assembly 120, as described below.

As shown in FIG. 3, supplemental support braces 118 may be provided for some support assemblies 110. The bottoms of support braces 118 are coupled to anchor plates (not specifically enumerated) for securing to the supporting structure, and the tops of support braces 118 are coupled to posts 112, preferably at upper portions thereof. Supplemental support braces 118 may be provided, for example, at every third support assembly 110, or at other locations (which may or may not be evenly spaced) along walkway system 100.

Decking assembly 120 comprises a single structural beam 122 along each side thereof. A plurality of longitudinally-oriented beams 122 are arranged in pairs along the length of walkway system 100. Each beam 122 has a height H (see FIG. 2) sufficient to accommodate the installation of cables within decking system 120, as described below. In some embodiments, H is at least 18 centimeters.

In the illustrated embodiment, each beam 122 comprises an I-beam having an upper flange 122U and a lower flange 122L connected by a central webbing 122W (see FIG. 2). In other embodiments, beams 122 may comprise "C"-channels, siderails, or custom extrusion members.

Each beam 122 is positioned atop beam support plates 113 of two or more support assemblies 110. In the illustrated embodiment, the ends of adjacent beams 122 running along one side of decking assembly 120 abut one another at the midpoints of beam support plates 113. Splice plates 121 (see FIG. 3) are preferably attached to the ends of adjacent beams 122 to cover the junctions therebetween. Splice plates 121 may be attached to beams 122 using suitable fasteners such as, for example, bolts and nuts.

A plurality of cross members 124 extend between each pair of beams 122 for supporting cables C (not shown in FIGS. 1-3, see FIG. 16B) or other flexible elongated members thereon. Cross members 124 are fixedly attached to lower portions of beams 122. In some embodiments, cross members 124 are welded to beams 122 in a suitable fabrication facility before being delivered to the location where walkway system 100 is to be installed. Cross members 124 are preferably supported by flanges extending inwardly from the bottoms of beams 122. Cross members 124 may be spaced approximately 30 cm (1 foot) apart in some embodiments. In other embodiments, cross members 124 may be spaced closer together or farther apart, depending upon the flexibility (or lack thereof) of the elongated members to be supported by cross members 124.

A rim angle 126 may be attached to the top of each beam 122. Rim angles 126 may be attached to beams 122 using suitable fasteners, such as bolts and nuts, for example. A plurality of decking members 130 extend between the rim angles 126 attached atop each pair of beams 122. Rim angles 126 provide upwardly extending flanges for aiding in the positioning of decking members 130. Decking members 130 provide structural support for decking assembly 120 by holding the tops of each pair of beams 122 in fixed relation to one another. In some embodiments, rim angles 126 may be attached to beams 122 using the same fasteners which are used to attach decking members 130 to beams 122, as described below.

Decking members 130 cooperate with beams 122 and cross members 124 to form a partial enclosure 140. As noted above, cross members 124 are fixedly attached to bottom portions of beams 122. Decking members 130 are fastened between the tops of beams 122, as described below, to provide increased structural stability to decking assembly 120. Partial enclosure 140 provides protection and support for cables located therein, and thus avoids the need for cable trays.

FIGS. 4 to 10 show details of decking members 130 according to one embodiment of the invention. In the illustrated embodiment, decking members 130 come in one of two types: a first type of decking member 130A, as shown in FIG. 6, and a second type of decking member 130B as shown in FIG. 7. As shown in FIGS. 4 and 5, decking members 130A and 130B (collectively referred to as decking members 130) are arranged in alternating fashion. Decking members 130A and 130B (collectively referred to as decking members 130) respectively comprise tread plates 131A and 131B (collectively referred to as tread plates 131) forming the tops thereof. Tread plates 131 may have ridges 132 protruding upwardly therefrom for providing increased traction for people walking on decking plates 130. Decking members 130A and 130B may also have reinforcing ribs 133A and 133B, respectively, extending downwardly from central portions thereof to provide increased rigidity to decking members 130.

Each decking member 130A has a pair of webs 134A extending downwardly from tread plate 131A near the edges thereof. Webs 134A are set back from the edges of tread plate 131A by a distance D1, to define flanges 135A. Webs 134A have a width equal to a distance D2.

Each decking member 130B has a pair of interlocking features 134B at the edged of tread plate 131B configured to correspond with the structure of decking members 130A.

Each interlocking feature 134B comprises a first portion 135B extending outwardly from the bottom of tread plate 131B for a distance equal to D1, to accommodate flanges 135A of decking members 130A. A second portion 136B extends downwardly from first portion 135B by a distance equal to the height of webs 134A, and a third portion 137B extends outwardly form the bottom of second portion 135B by a distance D3. A fourth portion 138B extends upwardly from the outward edge of third portion 137B. Distance D3 is greater than distance D2, and may be more than three times greater than distance D2 in some embodiments to allow decking members 130 to be arranged in a curved configuration, as described below with reference to FIGS. 8 to 10. In some embodiments, distance D2 is approximately 2.5 mm and distance D3 is 8 mm or more.

As shown in FIGS. 4 and 5, decking members 130 may be arranged in a straight configuration, with webs 134A of decking members 130A either abutting or spaced slightly apart from second portions 136B of decking members 130B. When installed, first portions 135B and third portions 137B of interlocking features 134B of decking members 130B are held in place under flanges 135A and webs 134A, respectively, of decking members 130A. Decking members 130 may be secured to beams 122 (and rim angles 126) by bolting or otherwise fastening decking members 130A to beams 122 at locations indicated by reference characters 139. Decking members 130B are thus held in place by portions of interlocking features 134B located under corresponding portions of decking members 130A without requiring bolts or other fasteners through decking members 130B. Accordingly, only half as many bolts or other fasteners are required to secure decking members 130 in place as compared to prior art decking systems.

Figure 8:
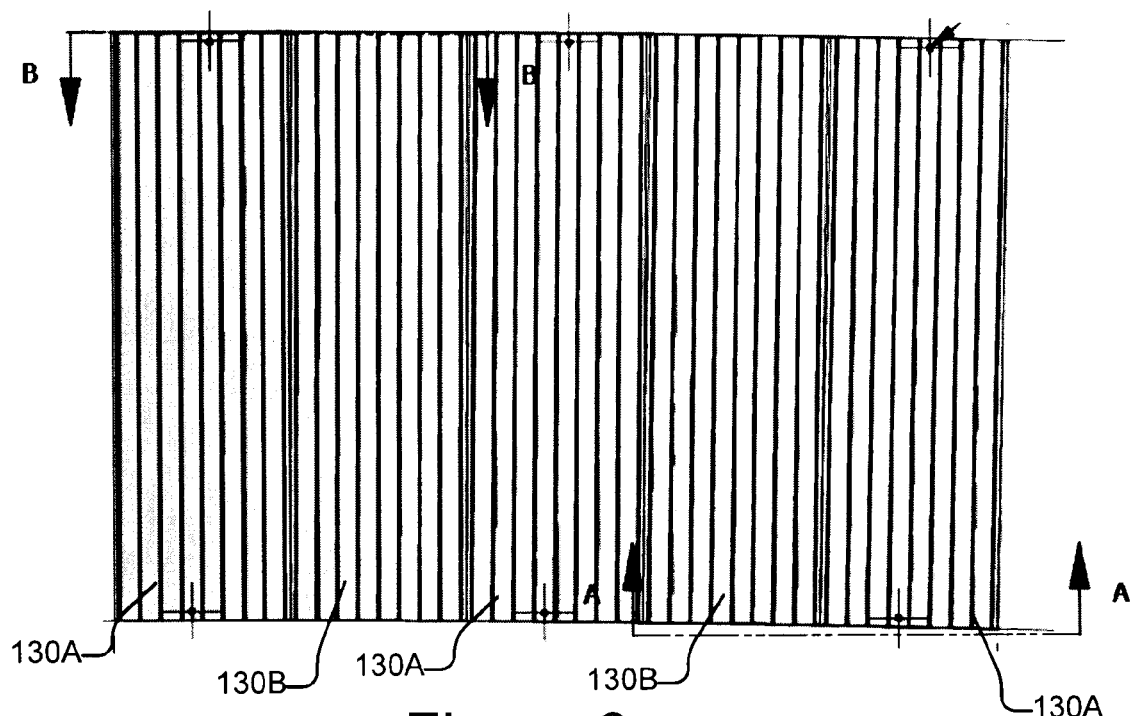
FIG. 8 is a top view of decking members arranged to follow a curve according to one embodiment of the invention.
Figure 9:
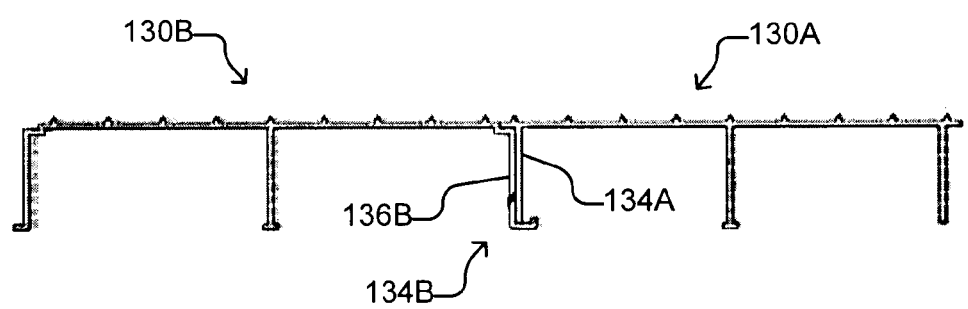
FIG. 9 is a sectional view taken along line A-A of FIG. 8.
Figure 10:
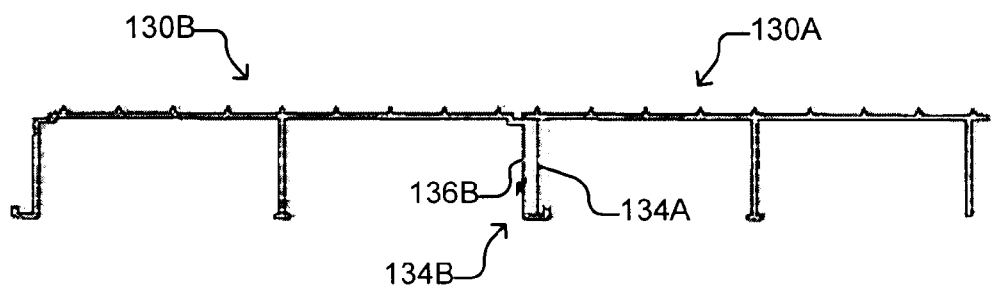
FIG. 10 is a sectional view taken along line B-B of FIG. 8.

Decking members 130 may also be arranged in a curved configuration, as shown in FIGS. 8 to 10. To arrange decking members 130 in a curved configuration, webs 134A of decking members 130A are positioned to abut second portions 136B of decking members 130B along one side of decking members 130, as shown in FIG. 9, and webs 134A of decking members 130A are positioned to be spaced apart from second portions 136B of decking members 130B along the other side of decking members 130, as shown in FIG. 10. This advantageously allows decking members 130 to be mounted on curved beams 122 without requiring specially made wedge-shaped decking, as would typically be required in prior art decking systems.

Figure 11:
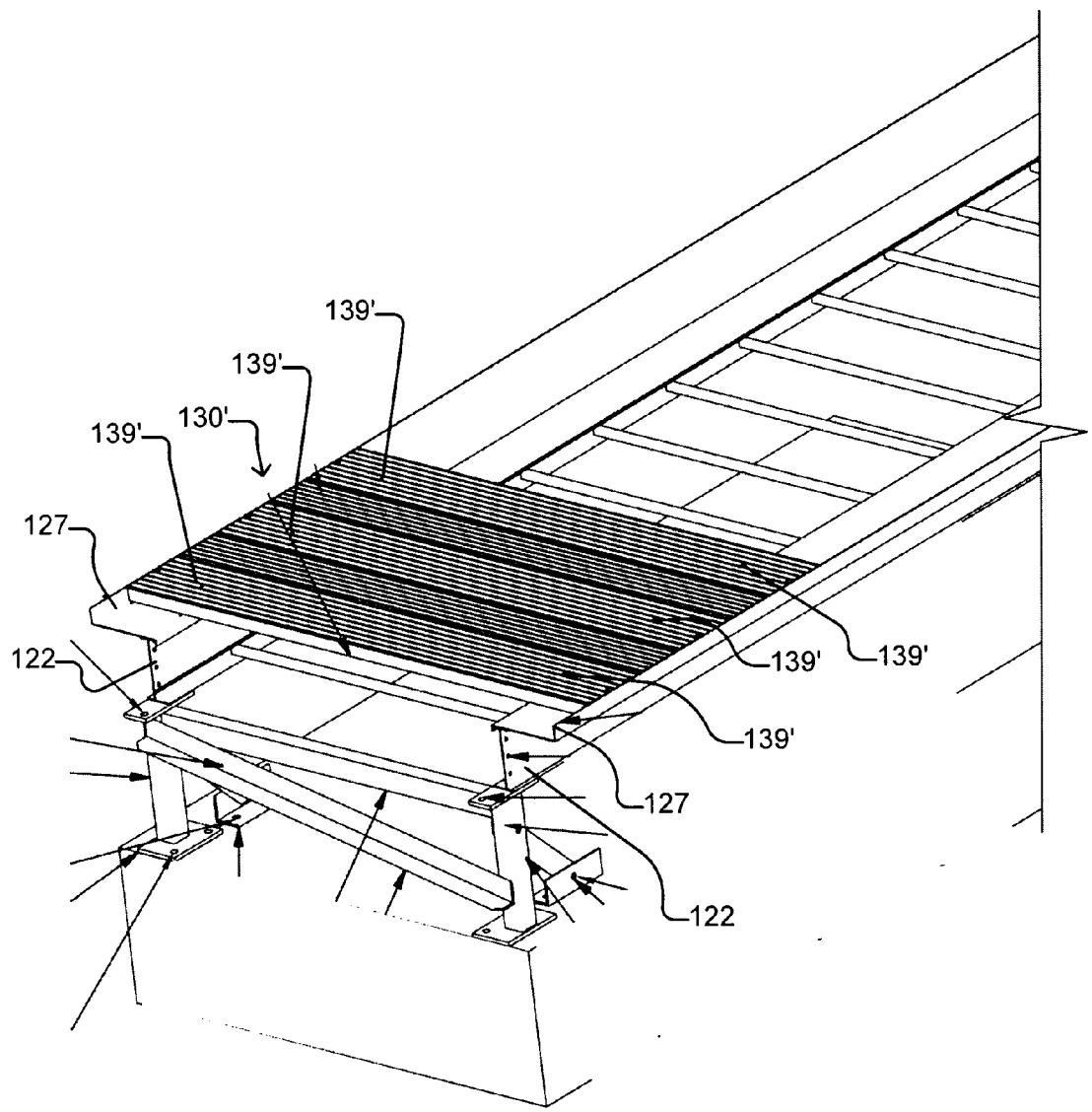
FIG. 11 is a close-up view of a portion of a walkway system according to another embodiment of the invention.

In some embodiments, decking members 130 have a length equal to a spacing between beams 122. In other embodiments, decking members 130 may be longer than the spacing between beams 122. FIG. 11 shows an embodiment similar to the embodiment of FIGS. 1-3 wherein rim angles 126 have been replaced with cantilevered rim members 127 to accommodate decking members 130' which are longer than the spacing between beams 122. Cantilevered rim members 127 and decking members 130' may be attached to beams 122 using suitable fasteners at locations indicated by reference characters 139'.

To install walkway system 100, support assemblies 110 are first mounted at predetermined locations along the length of the walkway. Supplemental support braces 118 may be provided for selected support assemblies, as described above. Next, a plurality of pairs of beams 122 (each pair of beams 122 coupled together by cross members 124) are fastened to beam support plates 113 of support assemblies. Each beam 122 may be attached to the associated beam support plates 113 using suitable fasteners such as, for example, bolts and nuts. Splice plates 121 are then fastened between the adjacent ends of beams 122. Next, cables may be laid out atop cross members 124. Once the cables are in place, decking members 130 (and optionally rim angles 126) are fastened across the tops of beams 122.

FIGS. 12 to 16 show walkway systems 200, 300, 400, 500 and 600 according to other embodiments of the invention. Walkway systems 200 300, 400, 500 and 600 are similar to walkway system 100, and where applicable, corresponding features thereof are indicated using corresponding reference characters (for example, for system 200, reference characters for features corresponding to those in system 100 have the form 2xx in place of 1xx). To avoid unnecessary repetition, features of systems 200 300, 400, 500 and 600 which are analogous to those described above will not be described again.

Figure 12:
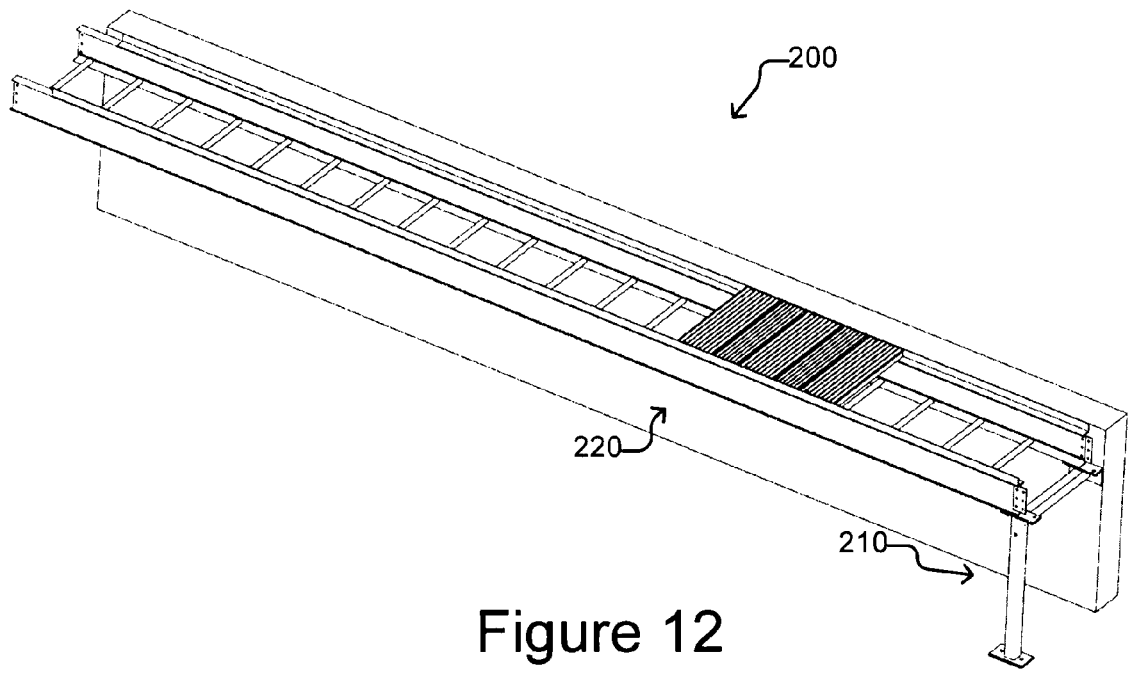
FIGS. 12 and 12A show a section of walkway system according to another embodiment of the invention and a support assembly therefor.
Figure 12A:
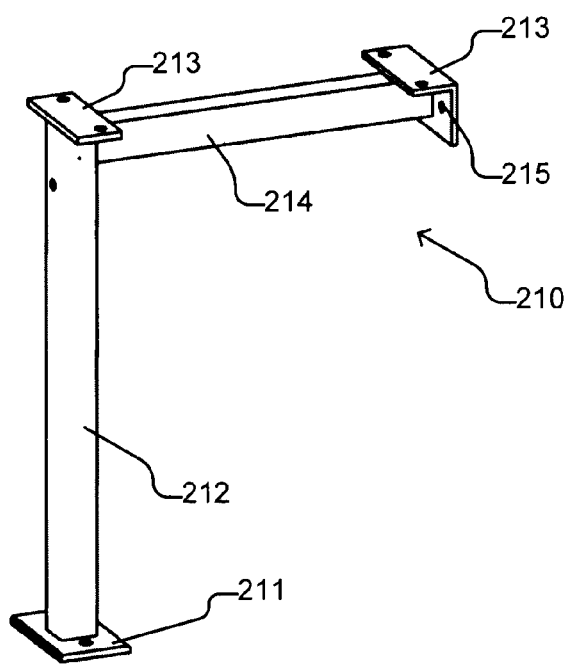

FIGS. 12 and 12A show a walkway system 200 which comprises a support assembly 210 configured for supporting decking assembly 220 from both the ground (or other horizontal supporting structure) and a vertical wall. Support assembly 210 comprises a post 212 with one of the beam support plates 213 at the top thereof, which is anchored to the ground using a base plate 211. The other of the beam support plates 213 is coupled to a side wall anchor plate 215, which is coupled to post 212 by horizontal brace 214. Side wall anchor plate 215 may be secured to the vertical wall using suitable fasteners.

Figure 13:
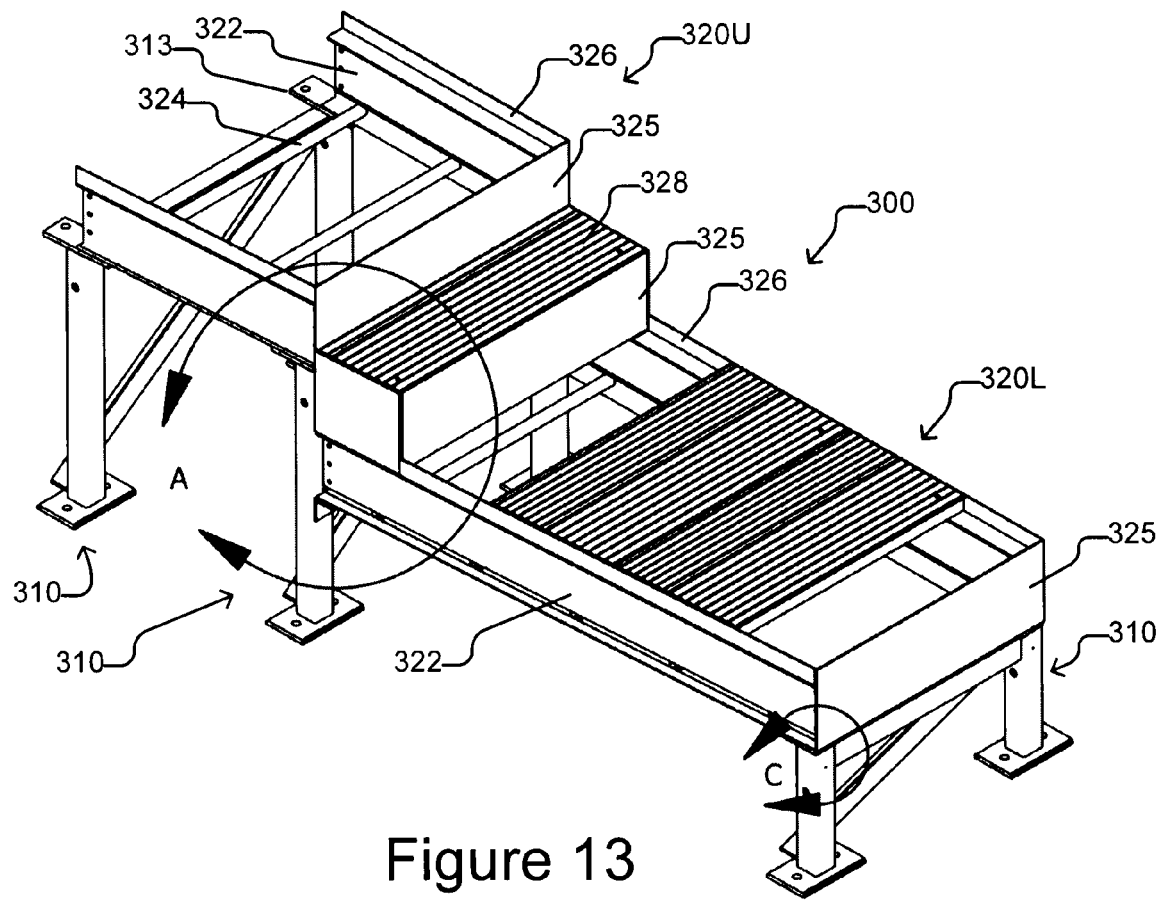
FIG. 13 shows a section of walkway system according to another embodiment of the invention.
Figure 13A:
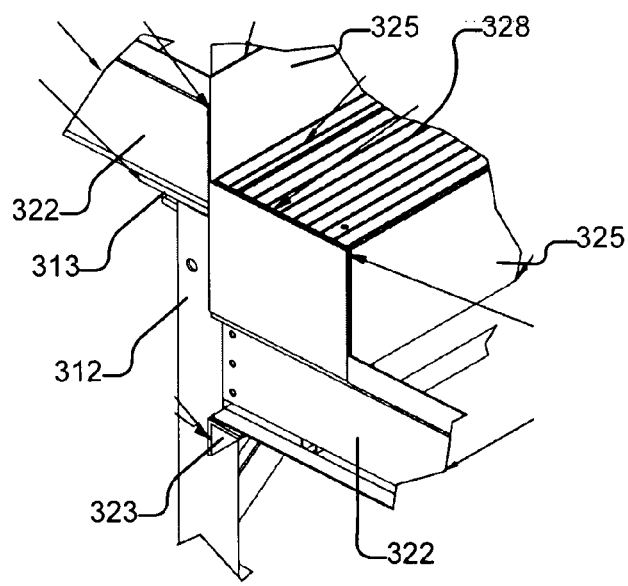
FIG. 13A is an enlarged view of the area indicated by circle A in FIG. 13.
Figure 13B:
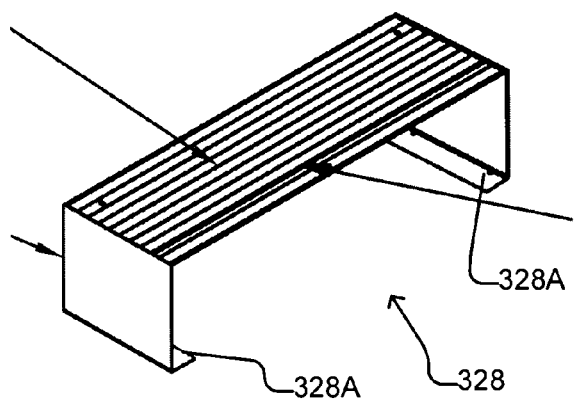
FIG. 13B shows the step of FIG. 13 in isolation.
Figure 13C:
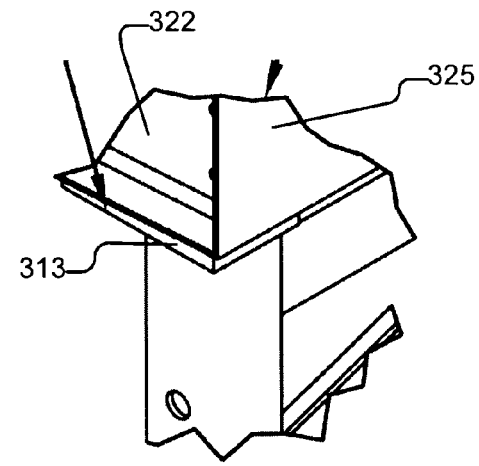
FIG. 13C is an enlarged view of the area indicated by circle C in FIG. 13.
Figure 13D:
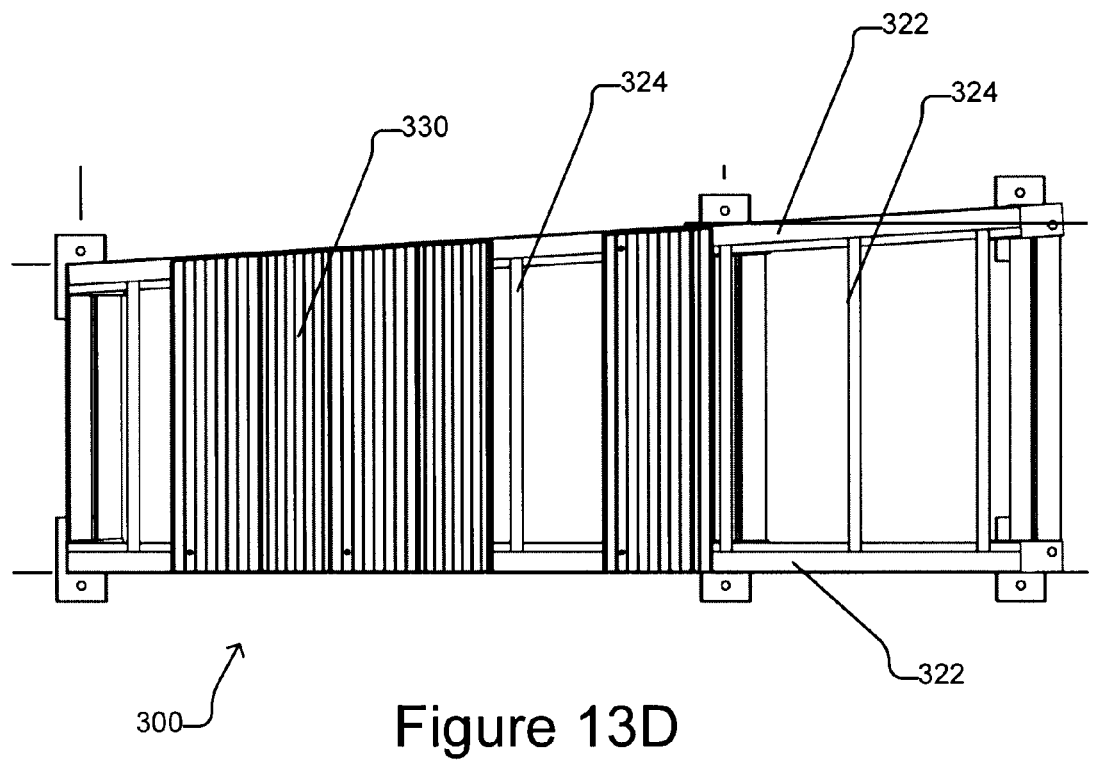

FIGS. 13 and 13A-D show a walkway system 300 which comprises a step 328 which facilitates walking between an upper decking assembly 320U and a lower decking assembly 320L. As shown in FIG. 13B, step 328 comprises inwardly extending flanges 328A at the bottom thereof. Flanges 328A are configured to be secured under rim angles 326 of lower decking assembly 320L. End plates 325 are attached to cover the ends of upper and lower decking assemblies 320U and 320L and the exposed side of step 328. The beams 322 of upper decking assembly 320U are supported by beam support plates 313 of support assemblies 310, as are the beams 322 of lower decking assembly 320L except at the junction between upper and lower decking assemblies 320U and 320L. At the junction between upper and lower decking assemblies 320U and 320L, support assembly 310 comprises one or more beam support flanges 323 attached to posts 312. Also, as shown in FIG. 13D, beams 322 of walkway system 300 are not parallel, but instead are at an angle to provide a change in width of system 300. Accordingly, cross members 324 and decking members 330 are likewise adapted to conform to the tapering width between beams 322.

Figure 14:
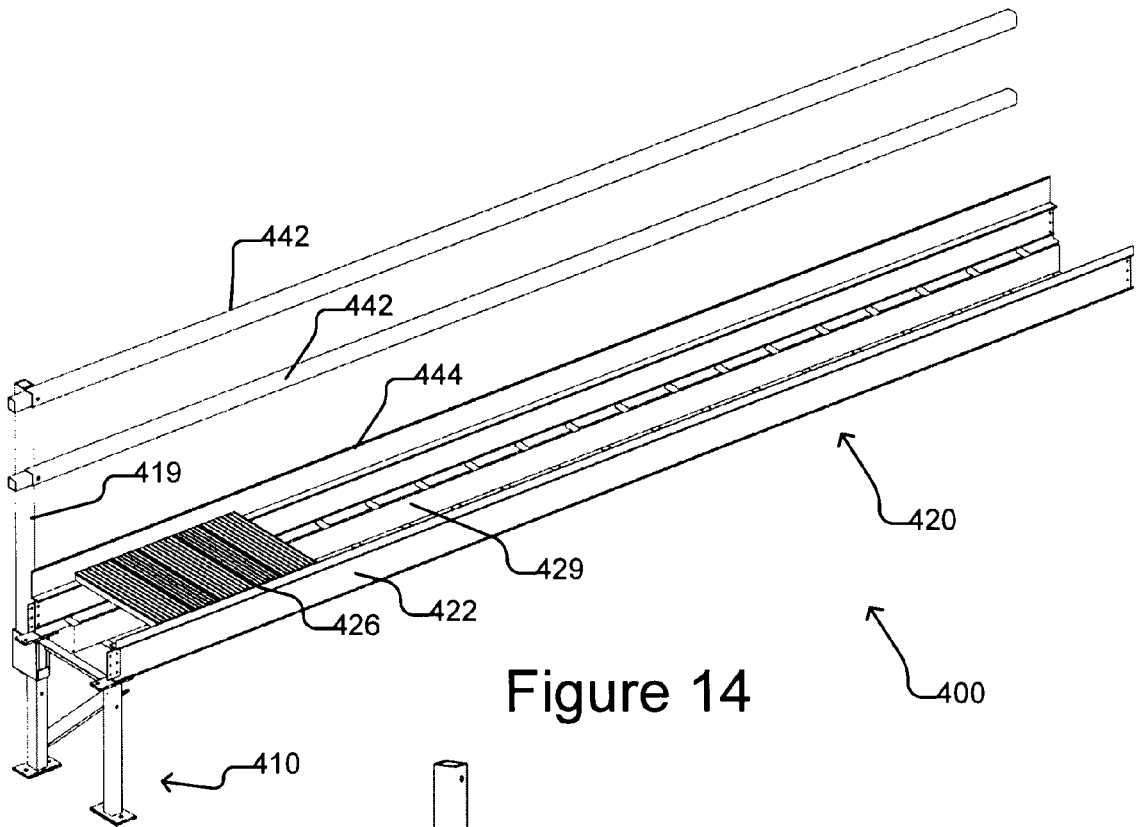
FIGS. 14 and 14A show a section of walkway system according to another embodiment of the invention and a support assembly therefor.
Figure 14A:
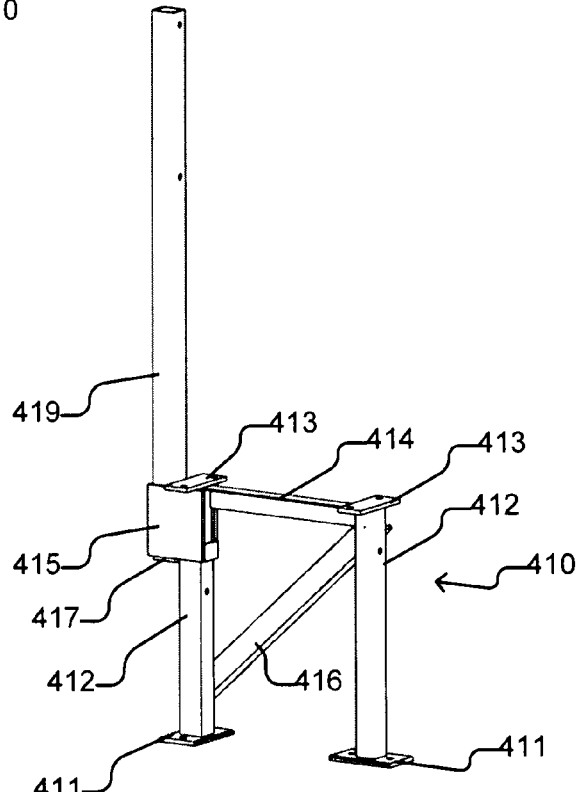

FIGS. 14 and 14A show a walkway system 400 which comprises a support assembly 410 configured to support one or more handrails 442 along one side thereof (two handrails are shown in the illustrated embodiment). Support assembly 410 comprises a socket 415 which is supported on one of posts 412 by a socket support plate 417. Socket 415 is configured to receive a handrail post 419 which in turn supports handrails 442. Decking assembly 420 has one rim angle 426 atop one beam 422, and has a kickplate 444 attached atop the beam 422 adjacent to handrails 442. A cable separator 429 may also be provided within decking assembly 420.

Figure 15:
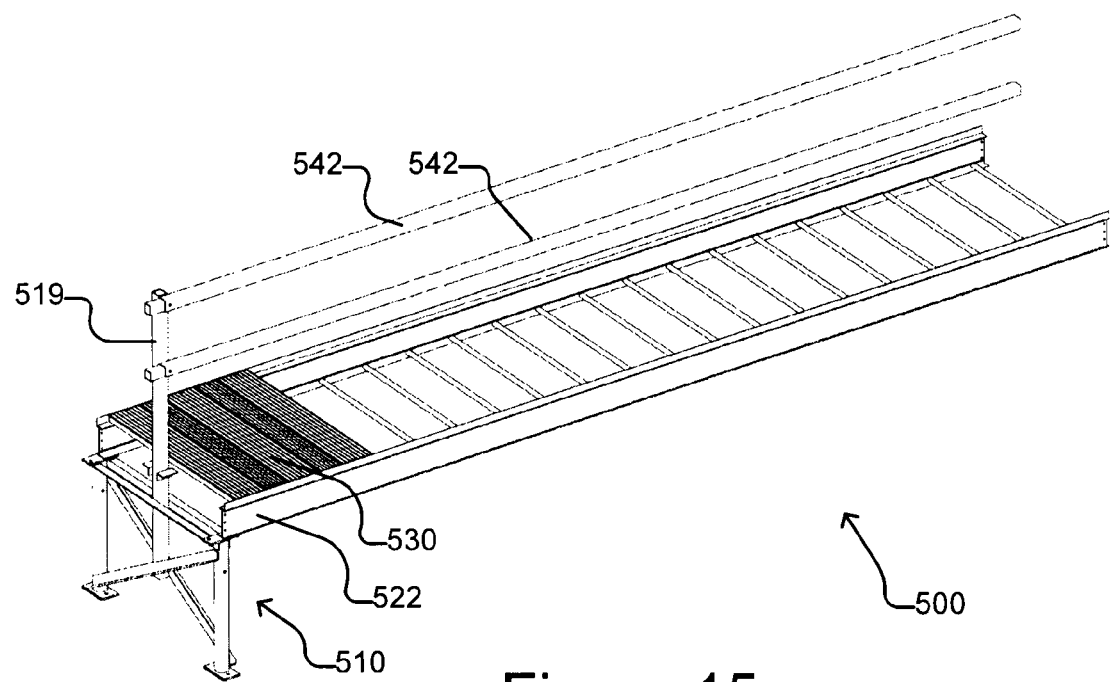
FIGS. 15 and 15A show a section of walkway system according to another embodiment of the invention and a support assembly therefor.
Figure 15A:
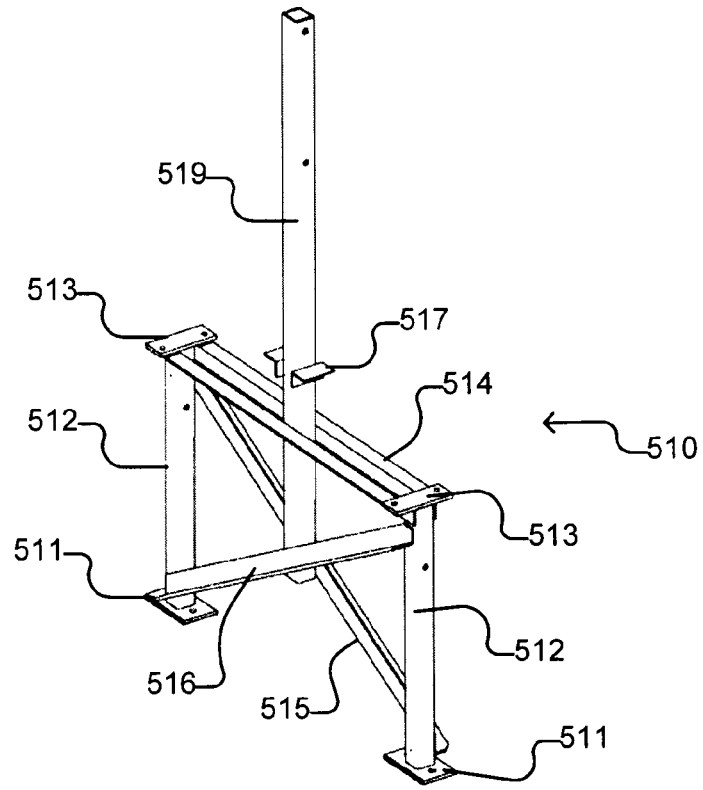

FIGS. 15 and 15A show a walkway system 500 which comprises a support assembly 510 configured to support one or more handrails 542 down a central portion thereof (two handrails are shown in the illustrated embodiment). Support assembly 510 comprises a pair of diagonal braces 515 and 516 arranged in an "X" configuration between posts 512. Diagonal braces 515 and 516 support a handrail post 519, the bottom end of which may be coupled therebetween. A pair of horizontal braces 514 extend between the tops of posts 512 on either side of handrail post 519. Handrail post 519 supports handrails 542, and also comprises one or more decking support flanges 517 for supporting decking members 530. Decking members 530 in the region of handrail post are adapted to fit around handrail post 519, for example, by providing a hole therethrough or by providing a pair of smaller sized decking members (not shown), each extending from handrail post 519 out to one of beams 522.

Figure 16:
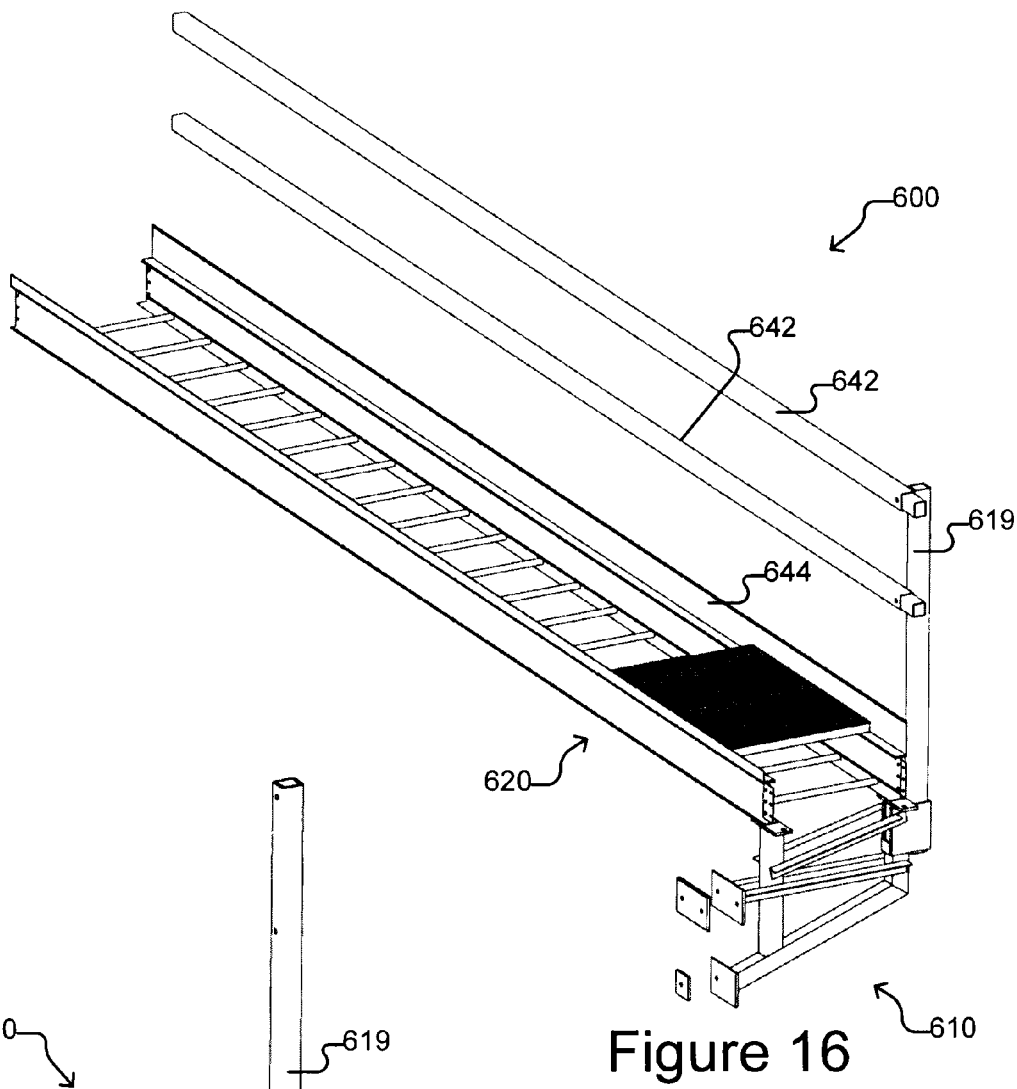
FIGS. 16 and 16A show a section of walkway system according to another embodiment of the invention and a support assembly therefor.
Figure 16A:
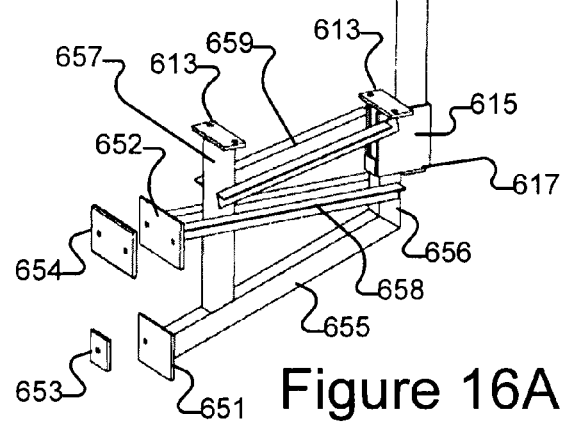
Figure 16B:
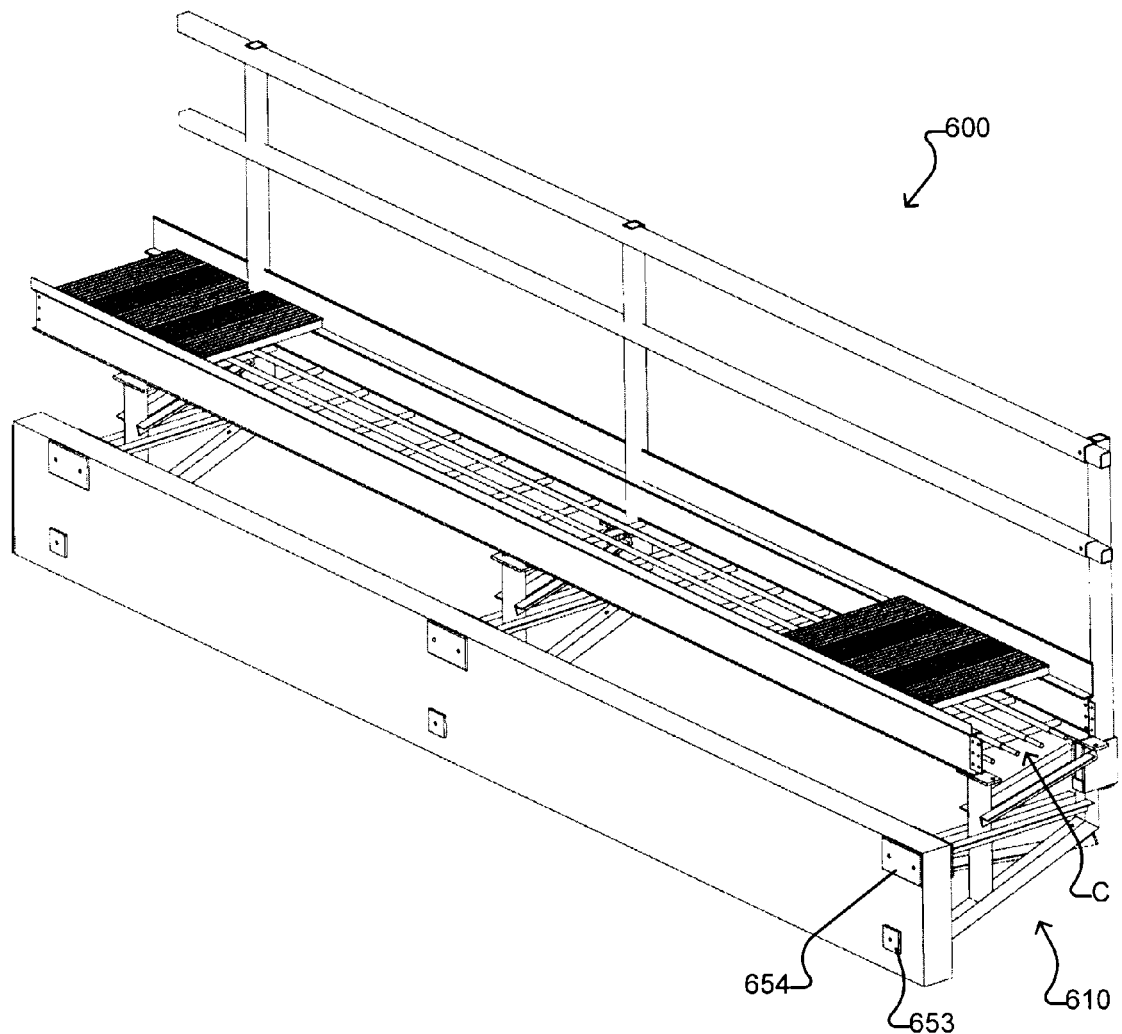
FIG. 16B shows the walkway system of FIG. 16 attached to a vertical wall.
Figure 17A:
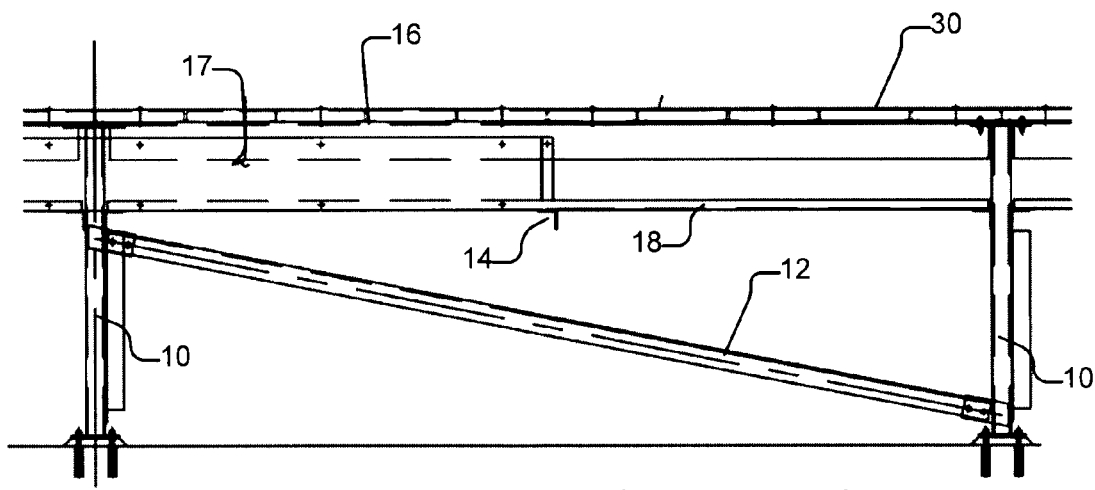
FIGS. 17A-C show an example prior art walkway system.
Figure 17B:
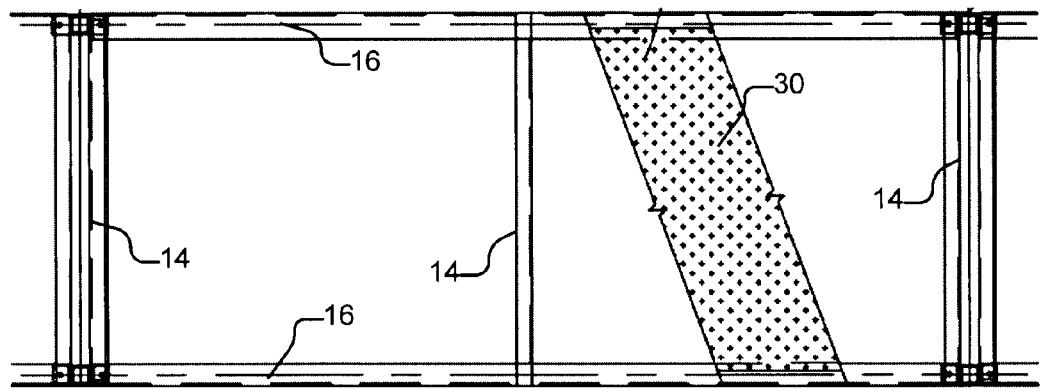
Figure 17C:
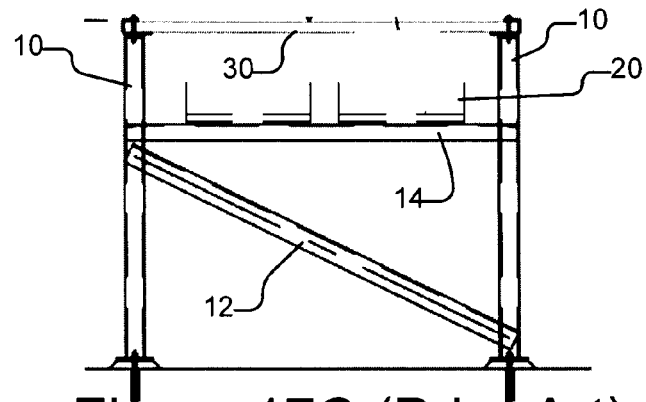

FIGS. 16, 16A and 16B show a walkway system 600 which comprises a support assembly 610 configured for supporting decking assembly 620 from only a vertical wall. Support assembly 610 comprises a lower side wall anchor plate 651 and an upper side wall anchor plate 652. Anchor plates 651 and 652 may be secured to the wall using suitable fastener (not shown) and corresponding backing plates 653 and 654, respectively. An angled support 655 extends outwardly and upwardly from lower side wall anchor plate 651.

An outer post 656, which has one beam support plate 613 on the top thereof, extends upwardly from the outer end of angled support 655. Outer post 656 may also comprise a socket support plate 617 for supporting a socket 615 and a handrail post 619. An inner post 657, which has the other beam support plate 613 on the top thereof, extends upwardly from an inner portion of angled support 655. A first pair of angled braces 658 extend outwardly and downwardly from upper side wall anchor plate 652 and are coupled to either side of both inner and outer posts 657 and 656. A second pair of angled braces 659 extend outwardly and downwardly from either side of inner post 657 to either side of outer post 656.

While a number of exemplary aspects and embodiments have been discussed above, those of skill in the art will recognize certain modifications, permutations, additions and sub-combinations thereof. It is therefore intended that the following appended claims and claims hereafter introduced are interpreted to include all such modifications, permutations, additions and sub-combinations as are within their true spirit and scope.

What is claimed is:

1. A walkway system comprising:
   a plurality of support assemblies, each support assembly comprising a pair of spaced apart beam support plates on an upper side thereof;
   a plurality of pairs of beams, each pair of beams supported by pairs of spaced apart beam support plates of at least two support assemblies;
   a plurality of cross members extending between lower portions of the pairs of beams the cross members configured to support one or more cables resting thereupon; and,
   a plurality of decking members extending between the pairs of beams, the decking members secured to upper sides of the beams,
   whereby the cross members, beams and decking members cooperate to form a partial enclosure for the cables, thereby eliminating the need for a separate cable tray, and
   wherein the decking members comprise a plurality of first-type decking members and a plurality of second-type decking members, each of the first-type decking members having a pair of webs extending downwardly therefrom near an edge thereof to define a pair of flanges, and each of the second-type decking members having interlocking features extending outwardly and downwardly from edges thereof, the interlocking features comprising portions configured to be held under the flanges and webs of the first-type decking members.

2. A walkway system according to claim 1 wherein each beam has an inwardly extending lower flange, and wherein the cross members are supported by the inwardly extending lower flanges of the beams.

3. A walkway system according to claim 1 wherein each beam comprises an I-beam having an upper flange and a lower flange connected by a generally vertically oriented web, and wherein the cross members are supported by the lower flanges of the I-beams.

4. A walkway system according to claim 3 comprising a rim angle attached along a top side of the upper flange of each I-beam, each rim angle providing a flange extending upwardly from an outer edge thereof.

5. A walkway system according to claim 3 comprising cantilevered rim members attached along a top side of the upper flange of each I-beam, the cantilevered rim members configured to accommodate decking members which are longer than the spacing between the I-beams.

6. A walkway system according to claim 3 wherein each support assembly comprises a pair of posts with a pair of diagonal braces arranged in an "X" configuration between spaced apart posts of the support assembly.

7. A walkway system according to claim 3 wherein the support assemblies are configured to be attached to both the ground and a vertical wall, wherein each support assembly comprises a first beam support plate anchored to the ground through a post and a second beam support plate coupled to the vertical wall.

8. A walkway system according to claim 3 wherein the support assemblies are configured to be attached to only a vertical wall, wherein each support assembly comprises a lower side wall anchor plate anchored to the vertical wall and an upper side wall anchor plate anchored to the vertical wall above the lower side wall anchor plate.

9. A walkway system according to claim 3 comprising one or more handrails supported by the support assemblies.

10. A walkway system according to claim 9 wherein the one or more handrails are coupled to the support assemblies by handrail posts which are received in sockets supported by socket support plates extending outwardly from the support assembly.

11. A walkway system according to claim 9 wherein each support assembly comprises a pair of posts with a pair of diagonal braces arranged in an "X" configuration between spaced apart posts of the support assembly, and wherein the one or more handrails are coupled to the support assemblies by handrail posts extending through the decking members, the handrail posts supported by the diagonal braces.

12. A walkway system according to claim 1 that is constructed entirely or almost entirely from aluminum.

13. A walkway system according to claim 1 comprising an end plate attached between ends of one of the pair of beams at an endpoint of the walkway system.

14. A walkway system according to claim 1 wherein the cross members are spaced approximately 30 cm apart.

15. A walkway system according to claim 1 wherein the cross members are spaced less than 30 cm apart.

* * * * *